(12) United States Patent
Shimawaki et al.

(10) Patent No.: US 12,443,152 B2
(45) Date of Patent: Oct. 14, 2025

(54) REMAINING CAPACITY ESTIMATION APPARATUS, MODEL GENERATION APPARATUS, AND NON-TRANSITORY COMPUTER-READABLE MEDIUM

(71) Applicant: AESC Japan Ltd., Kanagawa (JP)

(72) Inventors: Hidenori Shimawaki, Kanagawa (JP); Jiuting Chen, Kanagawa (JP)

(73) Assignee: AESC Japan Ltd., Kanagawa (JP)

( * ) Notice: Subject to any disclaimer, the term of this patent is extended or adjusted under 35 U.S.C. 154(b) by 388 days.

(21) Appl. No.: 17/996,277

(22) PCT Filed: Apr. 12, 2021

(86) PCT No.: PCT/JP2021/015145
§ 371 (c)(1),
(2) Date: Oct. 14, 2022

(87) PCT Pub. No.: WO2021/210526
PCT Pub. Date: Oct. 21, 2021

(65) Prior Publication Data
US 2023/0221683 A1  Jul. 13, 2023

(30) Foreign Application Priority Data
Apr. 17, 2020 (JP) ................... 2020-073844

(51) Int. Cl.
G05B 13/02 (2006.01)
G01R 31/367 (2019.01)
G01R 31/387 (2019.01)
H02J 7/00 (2006.01)

(52) U.S. Cl.
CPC ....... *G05B 13/0265* (2013.01); *G01R 31/367* (2019.01); *G01R 31/387* (2019.01); *H02J 7/0048* (2020.01)

(58) Field of Classification Search
CPC .................. G05B 13/0265; G01R 31/367; G01R 31/387; G01R 31/3648; G01R 31/382;
(Continued)

(56) References Cited

U.S. PATENT DOCUMENTS 11,243,262 B2  2/2022  Ukumori
2008/0234956 A1  9/2008  Mizuno et al.
(Continued)

FOREIGN PATENT DOCUMENTS

JP  2007-240521 A  9/2007
JP  2008-232758 A  10/2008
(Continued)

OTHER PUBLICATIONS

International Search Report issued in PCT/JP2021/015145; mailed Jun. 15, 2021.

*Primary Examiner* — Zhipeng Wang
(74) *Attorney, Agent, or Firm* — Studebaker Brackett PLLC

(57) ABSTRACT

A remaining capacity estimation apparatus includes a storage processing unit and a calculation unit. The storage processing unit acquires a model from a model generation apparatus and stores the model in a model storage unit. When data for updating the model are acquired from the model generation apparatus, the storage processing unit updates the model stored in the model storage unit. The calculation unit calculates a remaining capacity of a storage battery managed by the remaining capacity estimation apparatus by using the model stored in the model storage unit. At this time, data (measurement data for calculation) input to the model include a current, a voltage, and a temperature of the storage battery. When the input data when generating the
(Continued)

model are only a current, a voltage, and a temperature, the measurement data for calculation are only a current, a voltage, and a temperature.

16 Claims, 10 Drawing Sheets

(58) Field of Classification Search
CPC ........ H02J 7/0048; H02J 7/0047; G06N 3/09; Y02E 60/10; H01M 10/48
See application file for complete search history.

(56) References Cited

U.S. PATENT DOCUMENTS

| | | |
|---|---|---|
| 2016/0202324 A1 | 7/2016 | Biletska et al. |
| 2018/0095140 A1* | 4/2018 | Park ..................... G01R 31/378 |
| 2019/0157891 A1 | 5/2019 | Chemali et al. |
| 2020/0160179 A1* | 5/2020 | Chien ................... G10L 15/063 |
| 2020/0164763 A1* | 5/2020 | Holme .................... B60L 58/16 |
| 2021/0033675 A1 | 2/2021 | Ukumori |
| 2021/0033680 A1 | 2/2021 | Ukumori |
| 2022/0114421 A1* | 4/2022 | Li .......................... G06N 3/044 |

FOREIGN PATENT DOCUMENTS

| | | |
|---|---|---|
| JP | 2010-048759 A | 3/2010 |
| JP | 2019-004388 A | 1/2019 |
| WO | 2019/017991 A1 | 1/2019 |
| WO | 2019/181728 A1 | 9/2019 |
| WO | 2019/181729 A1 | 9/2019 |

* cited by examiner

REMAINING CAPACITY ESTIMATION APPARATUS, MODEL GENERATION APPARATUS, AND NON-TRANSITORY COMPUTER-READABLE MEDIUM

CROSS-REFERENCE TO RELATED APPLICATIONS

This application is a National Stage Entry of PCT/JP2021/015145 filed on Apr. 12, 2021, which claims priority from Japanese Patent Application 2020-073844 filed on Apr. 17, 2020, the contents of all of which are incorporated herein by reference, in their entirety.

TECHNICAL FIELD

The present invention relates to a remaining capacity estimation apparatus, a model generation apparatus, a remaining capacity estimation method, a model generation method, and a program.

BACKGROUND ART

In recent years, storage batteries have been used in various places. As a first example, a storage battery is used as a power source of a moving body such as a vehicle. As a second example, a storage battery is used for temporarily storing surplus power.

When a storage battery is used, it is important to accurately calculate a remaining capacity of the storage battery. For example, Patent Documents 1 and 2 describe that a model is generated by using machine learning such as a neural network, and a remaining capacity of a storage battery is calculated by using the model. In addition, Patent Document 3 describes that an SOH of a storage battery at a second time point, later than a first time point, is estimated by using an SOC and an SOH of the storage battery at the first time point. Further, Patent Document 4 describes that an SOH of a storage battery at a second time point, later than a first time point, is estimated by using an SOH of the storage battery at the first time point and time series data related to a state of the storage battery between the first time point and the second time point.

RELATED DOCUMENT

Patent Document

Patent Document 1: Japanese Patent Application Publication No. 2007-240521
Patent Document 2: Japanese Patent Application Publication No. 2008-232758
Patent Document 3: International Patent Publication No. WO 2019/181728
Patent Document 4: International Patent Publication No. WO 2019/181729

SUMMARY OF THE INVENTION

Technical Problem

In general, machine learning increases a calculation amount, but is often highly accurate. On the other hand, when the calculation amount at a time of estimating a remaining capacity of a storage battery is small, for example, the remaining capacity of the storage battery can be calculated in real time. Therefore, in a case of estimating the remaining capacity of the storage battery by using machine learning, it is important to reduce the calculation amount.

An example object of the present invention is to reduce a calculation amount in a case of estimating a remaining capacity of a storage battery by using machine learning.

Solution to Problem

According to the present invention, there is provided a remaining capacity estimation apparatus including:
  a storage processing unit that stores a model generated by performing machine learning on a plurality of pieces of training data in a storage unit, the training data using, as input values, measurement data for training including a current, a voltage, and a temperature of a storage battery, and using, as a target value, a remaining capacity value for training being a remaining capacity value of the storage battery; and
  a calculation unit that acquires measurement data for calculation including a current, a voltage, and a temperature of an object storage battery, the object storage battery being an object of processing, and inputs the measurement data for calculation to the model, thereby calculating a remaining capacity of the object storage battery.

According to the present invention, there is provided a model generation apparatus including:
  a training data acquisition unit that acquires a plurality of pieces of training data using, as input values, measurement data for training including a current, a voltage, and a temperature of a storage battery and using, as a target value, a remaining capacity value for training being a remaining capacity value of the storage battery; and
  a model generation unit that generates a model for calculating a remaining capacity of an object storage battery from measurement data for calculation including a current, a voltage, and a temperature of the object storage battery, the object storage battery being an object of processing, by performing machine learning on the plurality of pieces of training data.

According to the present invention, there is provided a model generation apparatus including:
  a training data acquisition unit that acquires a plurality of pieces of training data using, as input values, measurement data for training including a current, a voltage, and a temperature of a storage battery, and using, as a target value, a remaining capacity value for training being a remaining capacity value of the storage battery;
  a pre-processing unit that generates one-dimensional data consisting of z pieces of data, by processing n sets of the training data into an object matrix of m×n (where m is the number of types of data included in measurement data for training) and performing processing on the object matrix; and
  a model generation unit that generates a model for calculating a remaining capacity of an object storage battery from measurement data for calculation including a current, a voltage, and a temperature of the object storage battery, the object storage battery being an object of processing, by performing machine learning using the one-dimensional data as an input value.

According to the present invention, there is provided a remaining capacity estimation method including, by a computer:

storing a model generated by performing machine learning on a plurality of pieces of training data in a storage unit, the training data using, as input values, measurement data for training including a current, a voltage, and a temperature of a storage battery, and using, as a target value, a remaining capacity value for training being a remaining capacity value of the storage battery; and acquiring measurement data for calculation including a current, a voltage, and a temperature of an object storage battery, the object storage battery being an object of processing, and inputting the measurement data for calculation to the model, thereby calculating a remaining capacity of the object storage battery.

According to the present invention, there is provided a model generation method including, by a computer:

acquiring a plurality of pieces of training data using, as input values, measurement data for training including a current, a voltage, and a temperature of a storage battery and using, as a target value, a remaining capacity value for training being a remaining capacity value of the storage battery; and performing machine learning on the training data, thereby generating a model for calculating a remaining capacity of an object storage battery from measurement data for calculation including a current, a voltage, and a temperature of the object storage battery, the object storage battery being an object of processing.

According to the present invention, there is provided a model generation method including, by a computer:

acquiring a plurality of pieces of training data using, as input values, measurement data for training including a current, a voltage, and a temperature of a storage battery, and using, as a target value, a remaining capacity value for training being a remaining capacity value of the storage battery;

processing n sets of the training data into an object matrix of m×n, and performing processing on the object matrix, thereby generating one-dimensional data consisting of z pieces of data; and performing machine learning using the one-dimensional data as an input value, thereby generating a model for calculating a remaining capacity of an object storage battery from measurement data for calculation including a current, a voltage, and a temperature of the object storage battery, the object storage battery being an object of processing.

According to the present invention, there is provided a program providing a computer with:

a storage processing function of storing a model generated by performing machine learning on a plurality of pieces of training data in a storage unit, the training data using, as input values, measurement data for training including a current, a voltage, and a temperature of a storage battery, and using, as a target value, a remaining capacity value for training being a remaining capacity value of the storage battery; and a calculation function of acquiring measurement data for calculation including a current, a voltage, and a temperature of an object storage battery, the object storage battery being an object of processing, and inputting the measurement data for calculation to the model, thereby calculating a remaining capacity of the object storage battery.

According to the present invention, there is provided a program providing a computer with:

an acquisition function of acquiring a plurality of pieces of training data using, as input values, measurement data for training including a current, a voltage, and a temperature of a storage battery, and using, as a target value, a remaining capacity value for training being a remaining capacity value of the storage battery; and a model generation function of generating a model for calculating a remaining capacity of an object storage battery from measurement data for calculation including a current, a voltage, and a temperature of the object storage battery, the object storage battery being an object of processing, by performing machine learning on the training data.

According to the present invention, there is provided a program providing a computer with:

an acquisition function of acquiring a plurality of pieces of training data using, as input values, measurement data for training including a current, a voltage, and a temperature of a storage battery, and using, as a target value, a remaining capacity value for training being a remaining capacity value of the storage battery;

a pre-processing function of processing n sets of the training data into an object matrix of m×n and performing processing on the object matrix, thereby generating one-dimensional data consisting of z pieces of data; and a model generation function of generating a model for calculating a remaining capacity of an object storage battery from measurement data for calculation including a current, a voltage, and a temperature of the object storage battery, the object storage battery being an object of processing, by performing machine learning using the one-dimensional data as an input value.

Advantageous Effects of Invention

According to the present invention, in a case where a remaining capacity of a storage battery is estimated by using machine learning, a calculation amount is reduced.

DESCRIPTION OF EMBODIMENTS

Figure 1:
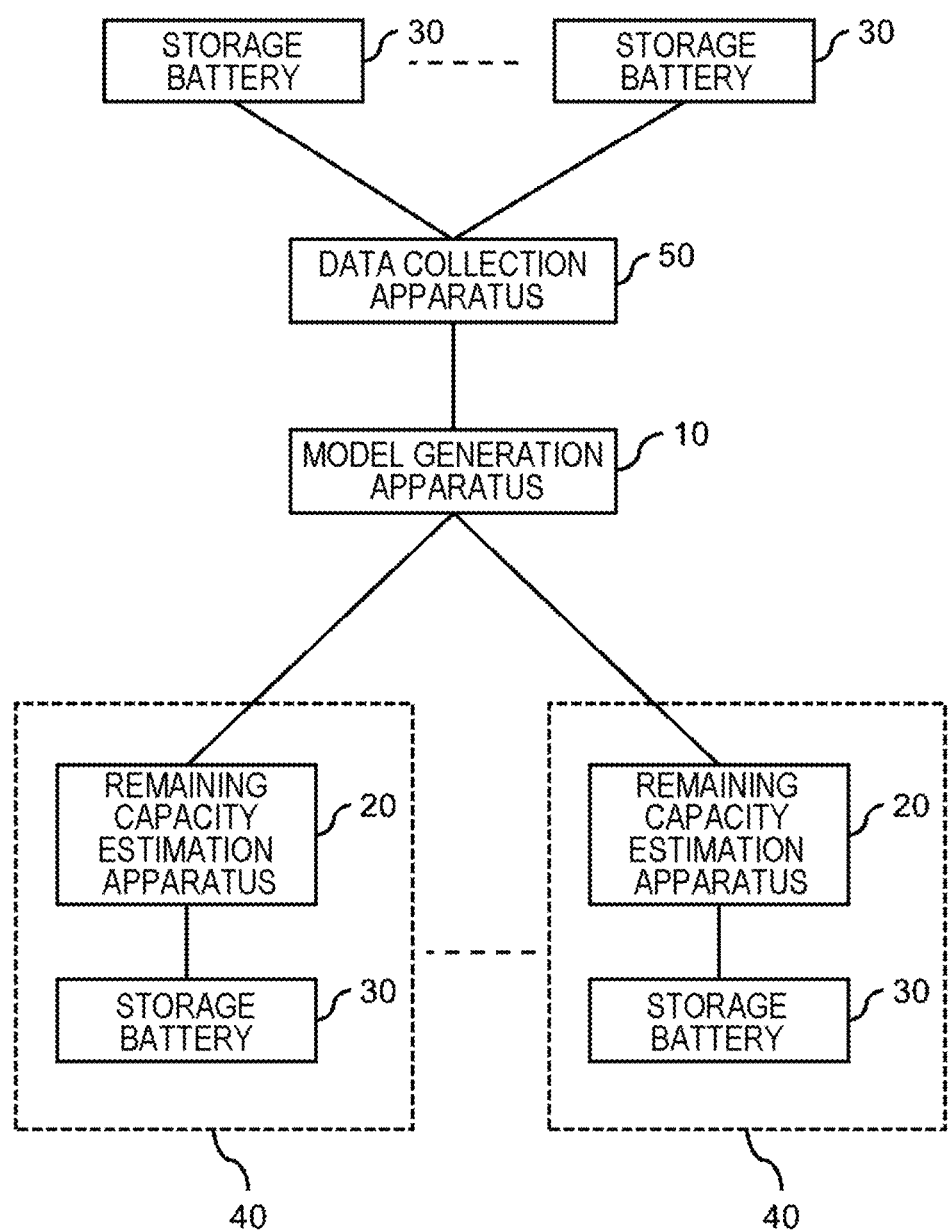
FIG. 1 is a diagram for explaining a usage environment of a model generation apparatus and a remaining capacity estimation apparatus according to an example embodiment.

Hereinafter, an example embodiment of the present invention will be explained by using the drawings. In all the drawings, the same components are denoted by the same reference numerals, and explanation thereof will be omitted as appropriate.

FIG. 1 is a diagram for explaining a usage environment of a model generation apparatus 10 and a remaining capacity estimation apparatus 20 according to an example embodiment. The model generation apparatus 10 and the remaining capacity estimation apparatus 20 are used together with a storage battery 30. The remaining capacity estimation apparatus 20 may be a Battery Management System (BMS) of the storage battery 30, or may be an apparatus different from the BMS of the storage battery 30.

The storage battery 30 supplies electric power to an equipment 40. In the example illustrated in this figure, the remaining capacity estimation apparatus 20 and the storage battery 30 are provided in the equipment 40. As one example, the equipment 40 is a vehicle such as an electric vehicle. However, when the storage battery 30 is a household storage battery, the equipment 40 is electric equipment used in the household. In this case, the storage battery 30 is located outside the equipment 40. Further, the storage battery 30 may be connected to a power grid network. In this case, the storage battery 30 is used for equalizing supplied power. Specifically, the equipment 40 stores electric power when the electric power is remaining, and supplies electric power when the electric power is running short.

The remaining capacity estimation apparatus 20 estimates a remaining capacity of the storage battery 30 (unit: Ah) by using a model. The model generation apparatus 10 generates and updates a model used by the remaining capacity estimation apparatus 20, by using machine learning, for example, a neural network.

The model generation apparatus 10 acquires measured values (hereinafter, referred to as actual result data) of data related to a state of the storage battery 30 from a plurality of storage batteries 30. A part of the plurality of pieces of actual result data is used as training data for machine learning, and at least a part of the remaining actual result data is used for verifying the model.

The actual result data include at least a current, a voltage, a temperature, and a remaining capacity value of the storage battery 30. Herein, it is preferable that the actual result data include information determining a type (e.g., a product name or a model number) of the storage battery 30. In this way, the model generation apparatus 10 can generate a model for each type of the storage battery 30. The remaining capacity estimation apparatus 20 can acquire a model being associated to the type of the storage battery 30 to which the remaining capacity estimation apparatus 20 is connected, from the model generation apparatus 10 and use the model. Therefore, estimation accuracy of the remaining capacity of the storage battery 30 by the remaining capacity estimation apparatus 20 is increased.

At least a part of the actual result data is acquired from a data collection apparatus 50. The data collection apparatus 50 is an apparatus that collects actual result data, and acquires actual result data from each of the plurality of storage batteries 30. The storage batteries 30 managed by the data collection apparatus 50 are used mainly for the purpose of collecting actual result data. Note that the actual result data may be further acquired from the remaining capacity estimation apparatus 20.

Figure 2:
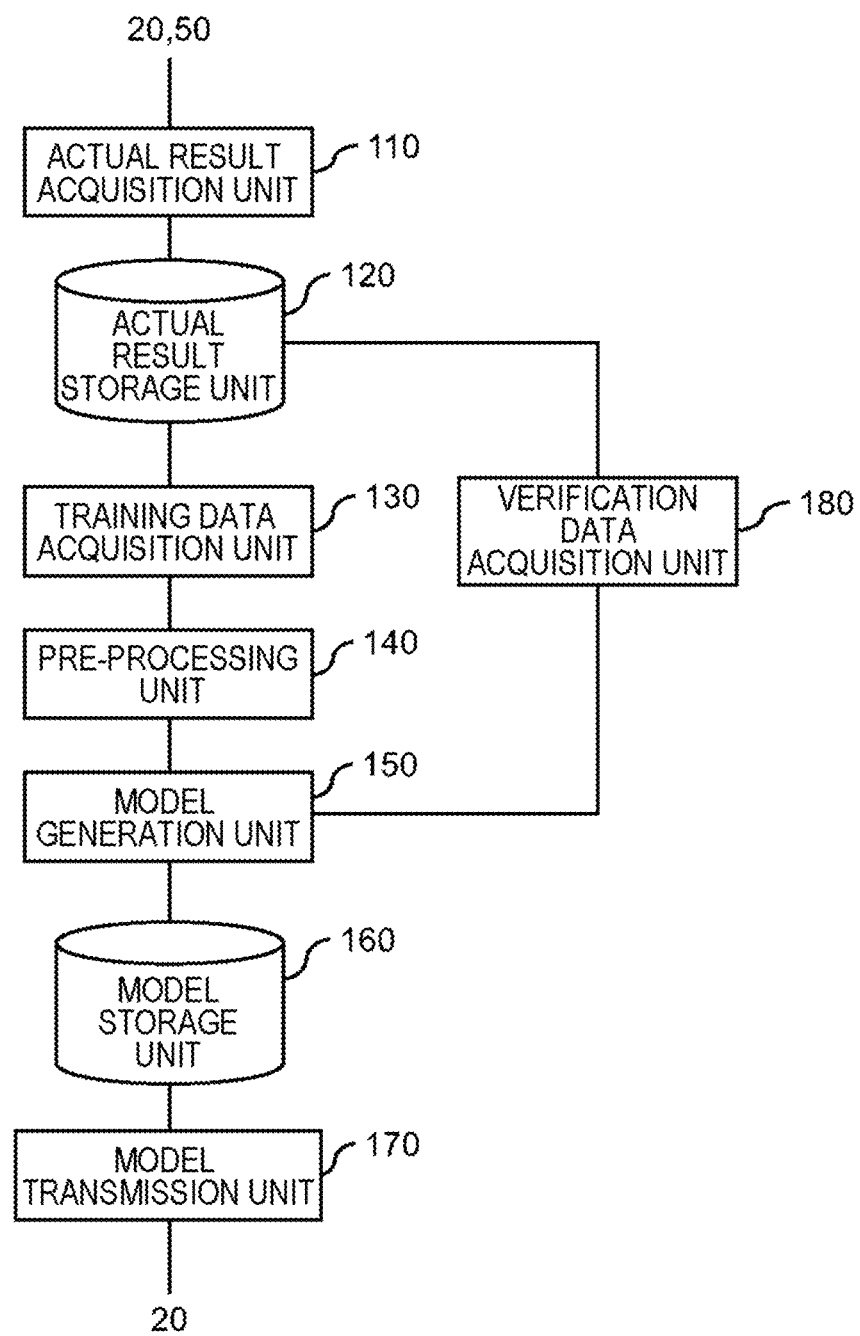
FIG. 2 is a diagram illustrating one example of a functional configuration of the model generation apparatus.

FIG. 2 is a diagram illustrating one example of a functional configuration of the model generation apparatus 10. In the example illustrated in the figure, the model generation apparatus 10 includes a training data acquisition unit 130 and a model generation unit 150. The training data acquisition unit 130 acquires a plurality of pieces of training data. In each piece of the training data, measurement data for training including a current, a voltage, and a temperature of a storage battery are used as input values, and a remaining capacity value for training which is a remaining capacity value of the storage battery is used as a target value. The model generation unit 150 generates a model by performing machine learning on the plurality of pieces of training data. This model calculates a remaining capacity of an object storage battery from measurement data for calculation including a current, a voltage, and a temperature of the object storage battery, the object storage battery being an object of processing.

Note that the measurement data for training may be only a current, a voltage, and a temperature. In this case, the measurement data for calculation being input to the model are also only the current, the voltage, and the temperature.

The model generation apparatus 10 further includes a pre-processing unit 140. When the type of data (parameters) included in the measurement data for training is m (e.g., m=3 in a case of only current, voltage, and temperature), the pre-processing unit 140 works n sets of measurement data for training into an object matrix of m×n, and processes the object matrix, thereby generating one-dimensional data consisting of z pieces of data. The model generation unit 150 generates a model by using the one-dimensional data as an input value. The pre-processing unit 140 uses a digital filter when generating a one-dimensional model. A detailed example of this processing will be described later.

Further, the pre-processing unit 140 generates a target value consisting of k pieces (where k<n) of data by processing n remaining capacity values for training which are associated to n sets of measurement data for training. Herein, k may be 1 or k may be z.

The model generated by the model generation unit 150 is stored in a model storage unit 160. Then, the model stored in the model storage unit 160 is transmitted to the remaining capacity estimation apparatus 20 by a model transmission unit 170. In the example illustrated in the figure, the model storage unit 160 and the model transmission unit 170 are part of the model generation apparatus 10. However, at least one of the model storage unit 160 and the model transmission unit 170 may be an external apparatus of the model generation apparatus 10.

In the example illustrated in the figure, the model generation apparatus 10 further includes an actual result acquisition unit 110, an actual result storage unit 120, a training data acquisition unit 130, and a verification data acquisition unit 180.

The actual result acquisition unit 110 acquires the above-described actual result data from at least one of the remaining capacity estimation apparatus 20 and the data collection apparatus 50, and stores the actual result data in the actual result storage unit 120. Herein, the actual result acquisition unit 110 stores the actual result data in association with information determining an acquisition source of the actual result data. In addition, the actual result acquisition unit 110 may store the actual result data in association with information indicating the type of the storage battery 30 that is an object of measurement of the actual result data.

As described above, a part of the plurality of actual result data is used as the training data described above, and at least a part of the remaining actual result data is used for verifying the model. Therefore, the actual result storage unit 120 stores each of the plurality of actual result data in association with information indicating whether the piece of actual result data is used as training data. This association may be performed in accordance with an input from a user, or may be performed by the actual result acquisition unit 110.

Then, the training data acquisition unit 130 reads the data being used as the training data out of the actual result data from the actual result data storage unit 120. When the model generation unit 150 generates a model for each type of the storage battery 30, the training data acquisition unit 130 reads the training data for each type of the model.

In addition, the verification data acquisition unit 180 reads out at least a part of the data that are not used as the training data out of the actual result data in order to verify the model generated by the model generation unit 150. This verification of the model is performed by the model generation unit 150.

Since the actual result acquisition unit 110 operates periodically, the actual result data stored in the actual result storage unit 120 are periodically updated (added). Then, the model generation unit 150 periodically updates the model. When the model stored in the model storage unit 160 is updated, the model transmission unit 170 transmits data for updating the model to the remaining capacity estimation apparatus 20.

Figure 3:
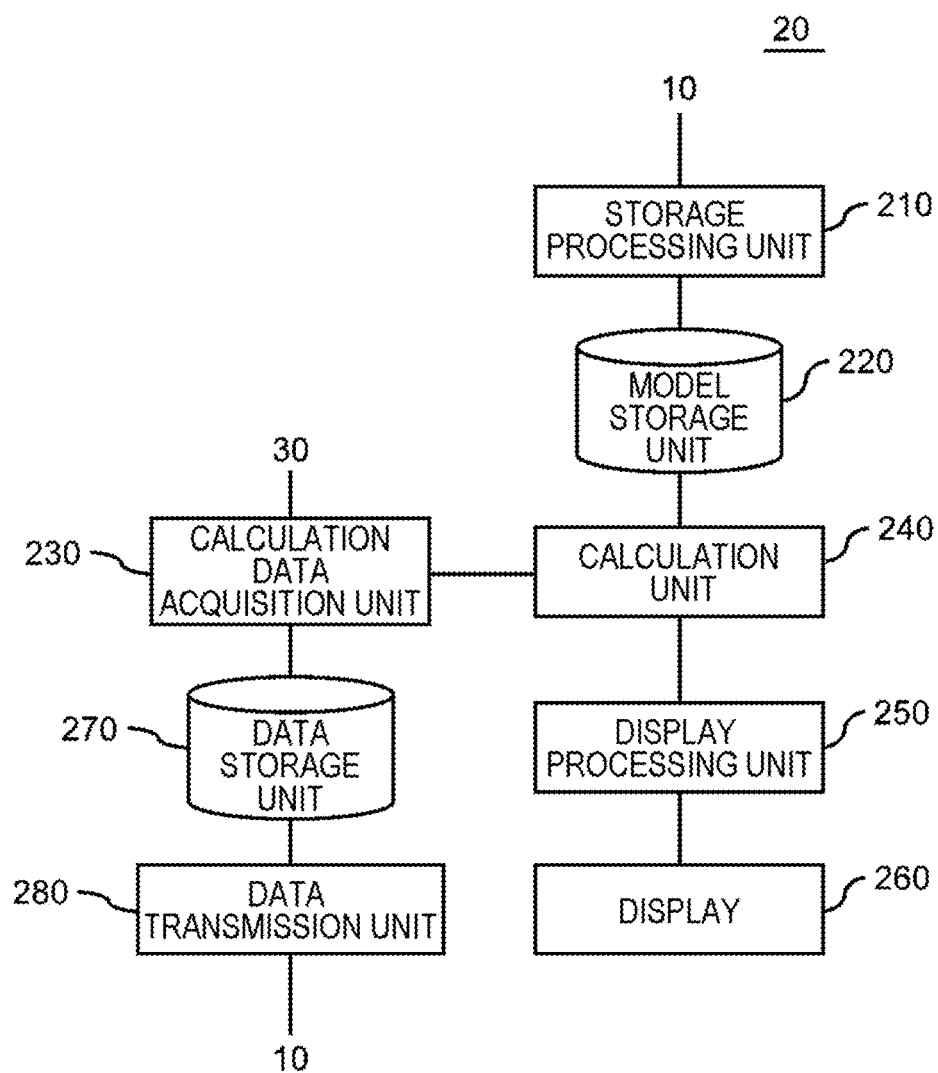
FIG. 3 is a diagram illustrating one example of a functional configuration of the remaining capacity estimation apparatus.

FIG. 3 is a diagram illustrating one example of a functional configuration of the remaining capacity estimation apparatus 20. The remaining capacity estimation apparatus 20 includes a storage processing unit 210 and a calculation unit 240.

The storage processing unit 210 acquires a model from the model generation apparatus 10 and stores the model in a model storage unit 220. When the data for updating the model are acquired from the model generation apparatus 10, the storage processing unit 210 uses this data so as to update the model stored in the model storage unit 220. In the example illustrated in this figure, the model storage unit 220 is a part of the remaining capacity estimation apparatus 20. However, the model storage unit 220 may be an external apparatus of the remaining capacity estimation apparatus 20.

The calculation unit 240 calculates a remaining capacity of the storage battery 30 being managed by the remaining capacity estimation apparatus 20, by using the model stored in the model storage unit 220. At this time, data being input to the model (hereinafter referred to as measurement data for calculation) include a current, a voltage, and a temperature of the storage battery 30. For example, when the input data at a time of generating the model are only a current, a voltage, and a temperature, the measurement data for calculation are only the current, the voltage, and the temperature.

In the present example embodiment, the remaining capacity estimation apparatus 20 includes a display processing unit 250. The display processing unit 250 causes a display 260 to display the remaining capacity of the storage battery 30 that has been calculated by the calculation unit 240. The display 260 is disposed at a position visible to a user of the equipment 40. For example, when the equipment 40 is a vehicle, the display 260 is provided inside the vehicle (e.g., in front of a driver's seat or obliquely in front of the driver's seat).

An operation amount of processing performed by the calculation unit 240 is small. Therefore, when the calculation unit 240 acquires measurement data for calculation in real time, the calculation unit 240 can calculate the remaining capacity of the storage battery 30 in almost real time. Therefore, the user of the equipment 40 can check the remaining amount of the storage battery 30 in almost real time by looking at the display 260.

In the example illustrated in the figure, the remaining capacity estimation apparatus 20 further includes a calculation data acquisition unit 230, a data storage unit 270, and a data transmission unit 280.

The calculation data acquisition unit 230 acquires measurement data for calculation from the storage battery 30. The data storage unit 270 stores data acquired by the calculation data acquisition unit 230. The data transmission unit 280 transmits at least a part of the measurement data for calculation to the model generation apparatus 10 together with data for determining the remaining capacity of the storage battery 30 at the time when the measurement data for calculation are measured. The data are treated as actual result data. The data for determining the remaining capacity of the storage battery 30 at the time when the measurement data for calculation are measured are calculated, for example, as follows. This calculation processing may be performed by the remaining capacity estimation apparatus 20 or may be performed by an external apparatus of the remaining capacity estimation apparatus 20.

First, a relationship between a charging rate (SOC) and an open circuit voltage (OCV) of the storage battery 30 is examined in advance. Then, the open circuit voltage is periodically measured, and the measured value is converted into a storage rate of the storage battery 30, thereby calculating a change amount of the charging rate, i.e., a change of the charging rate ($\Delta$SOC) of the storage battery 30 during a predetermined period.

On the other hand, a change amount ($\Delta$C) in the remaining capacity of the storage battery 30 during the above-described predetermined period is calculated by continuously measuring a discharge current and a charging current of the storage battery 30, respectively and integrating the measurement results. Then, an absolute value of the full capacity of the storage battery 30 is calculated by dividing the change amount ($\Delta$C) by $\Delta$SOC ($\Delta$C/$\Delta$SOC).

The above-described processing of calculating the absolute value of the full capacity of the storage battery 30 is periodically performed. The remaining capacity of the storage battery 30 at a desired timing is calculated by "SOC at that timing×the absolute value of the full capacity of the storage battery 30".

Figure 4:
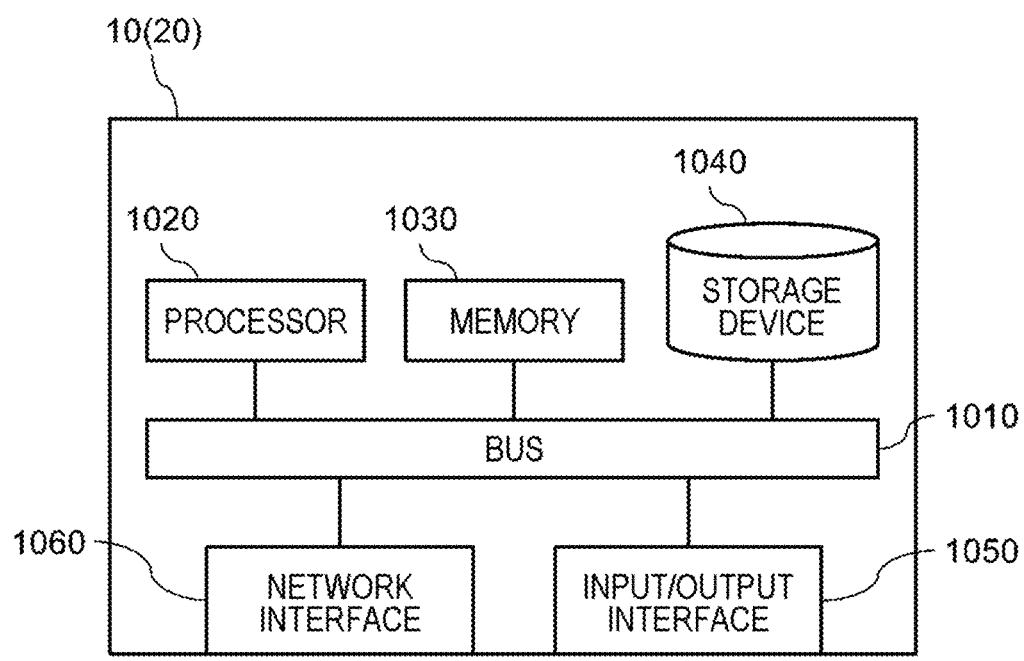
FIG. 4 is a diagram illustrating an example of a hardware configuration of the model generation apparatus.

FIG. 4 is a diagram illustrating an example of a hardware configuration of the model generation apparatus 10. The model generation apparatus 10 includes a bus 1010, a processor 1020, a memory 1030, a storage device 1040, an input/output interface 1050, and a network interface 1060.

The bus 1010 is a data transmission path through which the processor 1020, the memory 1030, the storage device 1040, the input/output interface 1050, and the network interface 1060 transmit and receive data to and from each other. However, a method of connecting the processor 1020 and the like to each other is not limited to bus connection.

The processor 1020 is a processor achieved by a Central Processing Unit (CPU), a Graphics Processing Unit (GPU), or the like.

The memory 1030 is a main storage achieved by a Random Access Memory (RAM) or the like.

The storage device 1040 is an auxiliary storage achieved by a Hard Disk Drive (HDD), a Solid State Drive (SSD), a memory card, a Read Only Memory (ROM), or the like. The storage device 1040 stores a program module that achieves each function of the model generation apparatus 10 (e.g., the actual result acquisition unit 110, the training data acquisition unit 130, the pre-processing unit 140, the model generation unit 150, the model transmission unit 170, and the verification data acquisition unit 180). When the processor 1020 reads and executes the program modules on the memory 1030, each function being associated to the program module is achieved. The storage apparatus 1040 also functions as the actual result storage unit 120 and the model storage unit 160.

The input/output interface 1050 is an interface for connecting the model generation apparatus 10 and various kinds of input/output equipment.

The network interface 1060 is an interface for connecting the model generation apparatus 10 to a network. The network is, for example, a Local Area Network (LAN) or a Wide Area Network (WAN). The method by which the network interface 1060 connects to the network may be a wireless connection or a wired connection. The model generation apparatus 10 may communicate with the remaining capacity estimation apparatus 20 and the data collection apparatus 50 via the network interface 1060.

The hardware configuration of the remaining capacity estimation apparatus 20 is also similar to the example illustrated in FIG. 4. The storage device stores a program module that achieves each function of the remaining capacity estimation apparatus 20 (e.g., the storage processing unit 210, the calculation data acquisition unit 230, the calculation unit 240, the display 260, and the data transmission unit 280). The storage device also functions as the model storage unit 220 and the data storage unit 270.

Figure 5:
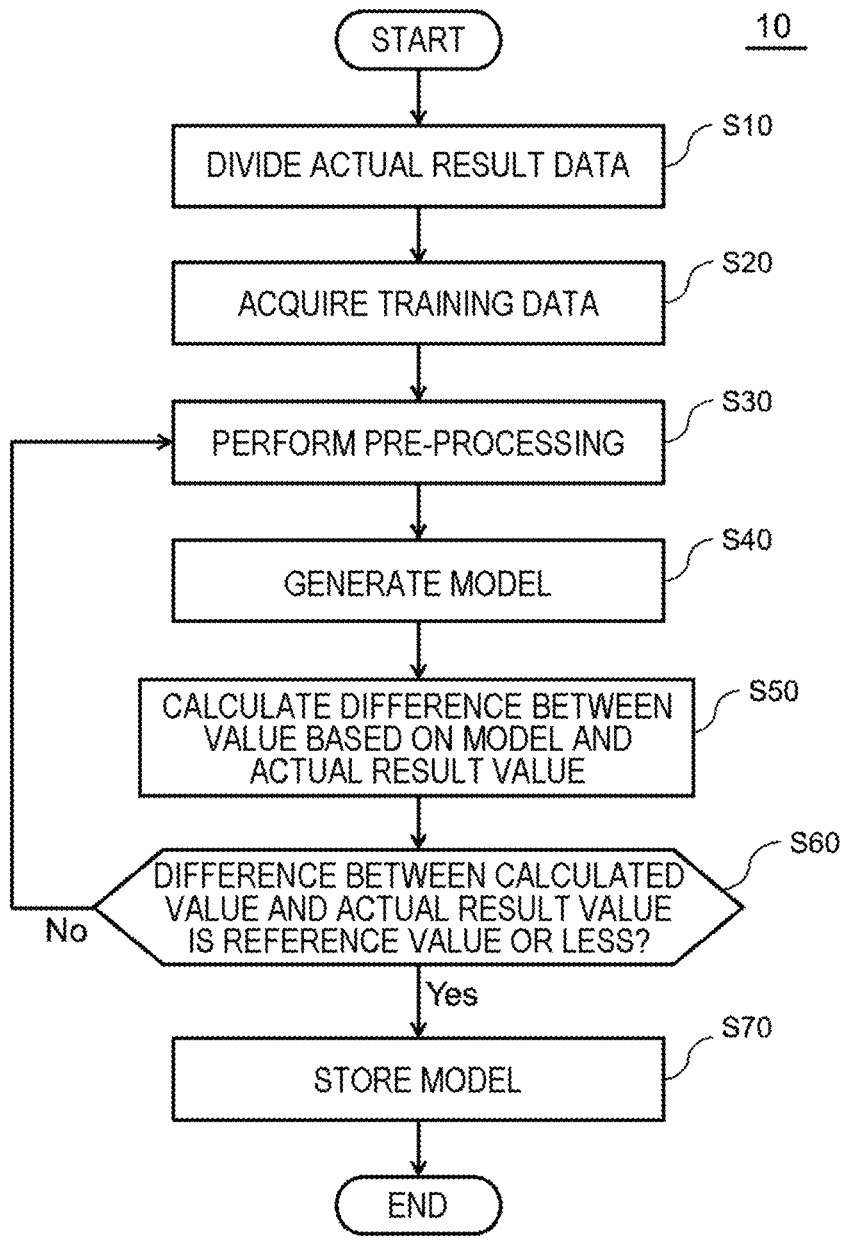
FIG. 5 is a flowchart illustrating one example of model generation processing performed by the model generation apparatus.

FIG. 5 is a flowchart illustrating one example of a model generation processing performed by the model generation apparatus 10. Apart from the processing illustrated in this figure, the actual result acquisition unit 110 repeatedly acquires the actual result data and updates the actual result storage unit 120.

First, the actual result data are classified into training data and other data (step S10). Then, the training data acquisition unit 130 of the model generation apparatus 10 reads the training data from the actual result storage unit 120 (step S20). Next, the pre-processing unit 140 performs pre-processing on the training data, and converts the measurement data for training (i.e., input data) included in the training data into one-dimensional data. At this time, a digital filter (described later) is used. The pre-processing unit 140 also converts an actual result value (i.e., a target value) of the remaining capacity included in the training data into a predetermined format (step S30). A detailed example of step S30 will be explained by using other figures.

Then, the model generation unit 150 generates a model by using the training data after having been converted in step S30 (Step S40).

Thereafter, the model generation unit 150 reads, from the actual result storage unit 120, data that are not used as training data out of the actual result data, and verifies the accuracy of the model calculated in step S40 by using this data. Specifically, the model generation unit 150 inputs data including a current, a voltage, and a temperature to the generated model, and acquires a calculated value of the remaining capacity. Then, a difference between the calculation value and an actual result value of the remaining capacity read out from the actual result storage unit 120 is calculated (step S50). When the difference is equal to or less than a reference value (step S60: Yes), the model generation unit 150 stores the generated model in the model storage unit 160 (step S70).

On the other hand, when the difference calculated in step S50 is greater than the reference value (step S60: No), the processing from step S30 onward are repeated. At this time, the pre-processing unit 140 changes a value of the digital filter to be used in the pre-processing as necessary. When the model is a neural network, the model generation unit 150 optimizes coefficients between neurons of the neural network as necessary. These two processing may be performed each time or only one of them may be performed.

Herein, when the value of the digital filter to be used in the pre-processing is changed, the model generation unit 150 also stores the changed value of the digital filter in the model storage unit 160. Then, the model transmission unit 170 transmits this value of the digital filter to the remaining capacity estimation apparatus 20. The storage processing unit 210 of the remaining capacity estimation apparatus 20 also stores the value of the digital filter together with the model, in the model storage unit 220. Thus, the calculation unit 240 of the remaining capacity estimation apparatus 20 can perform the same conversion processing as in step S30. One example of the timing at which the value of the digital filter is transmitted is when the model is transmitted to the remaining capacity estimation apparatus 20.

When a model is generated for each type of the storage battery 30, the model generation apparatus 10 performs the processing illustrated in FIG. 5 for each type.

Figure 6:
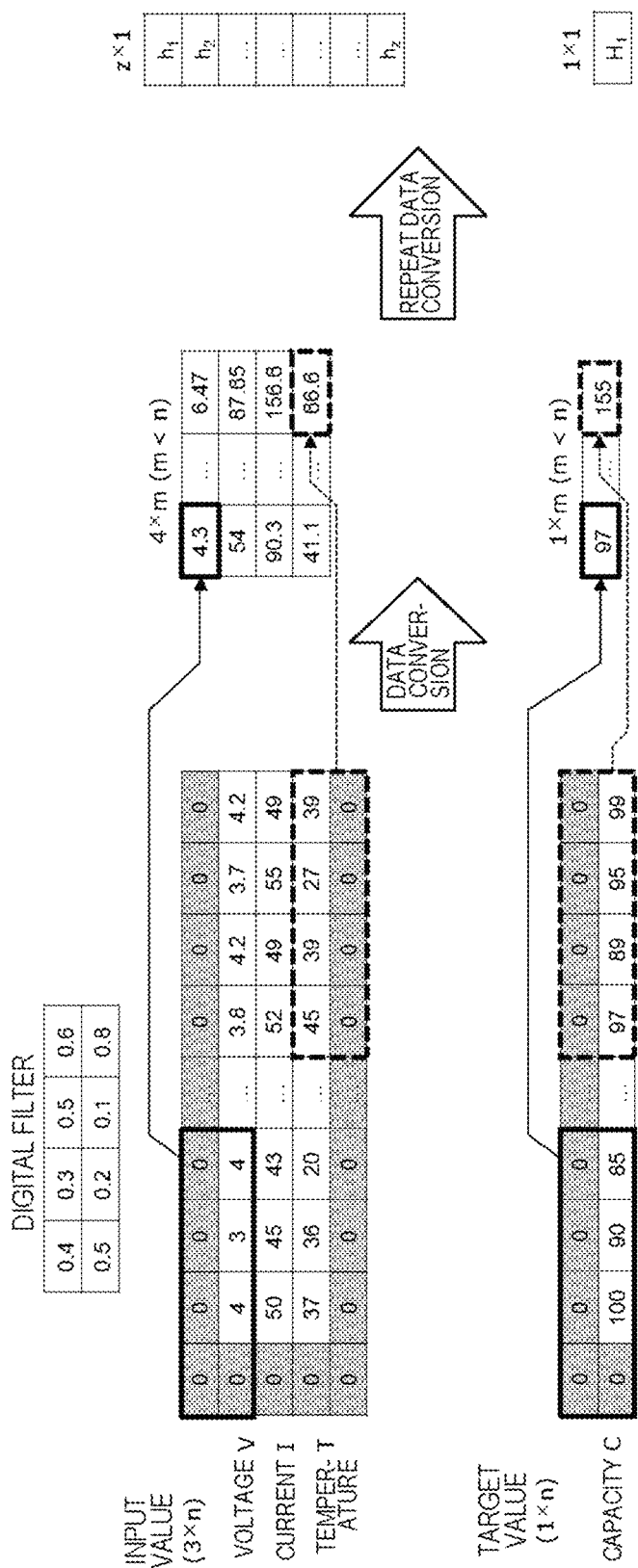
FIG. 6 is a diagram for explaining a first example of step S30 of FIG. 6.

FIG. 6 is a diagram for explaining a first example of pre-processing (step S30 in FIG. 6) performed by the pre-processing unit 140 of the model generation apparatus 10. As explained by using FIG. 2, the pre-processing unit 140 works n sets of measurement data for training into object matrices of m×n and processes the object matrices, thereby generating one-dimensional data consisting of z pieces of data. Herein, m is the number of types of data (parameters) included in the measurement data for training.

In the example illustrated in this figure, the pre-processing unit 140 processes digital filter on the object matrix, thereby performing, at least once, conversion processing of, while expanding one of rows and columns of the object matrix, the one being associated to the current, the voltage, and the temperature (in the example illustrated in this figure, referred to as a column in the following explanation) to a number of dimensions larger than the number of dimensions of the one, reducing the other of the rows and the columns of the object matrix (in the example illustrated in this figure, referred to as a row in the following explanation) to a number of dimensions smaller than the number of dimensions of the other. As a result, one-dimensional data to be input data are generated.

More specifically, the digital filter is a matrix. The pre-processing unit 140 performs the following (1) and (2) at least once as the conversion processing.

(1) A partial matrix consisting of the same number of rows and the same number of columns as the digital filter is extracted from the object matrix.

(2) A digital filter is operated on the partial matrix, and a value acquired by adding each element of the operation result is set as an element of the object matrix after processing. The operation performed here is, for example, multiplication, but may be addition, subtraction, or division, or may be a combination of four arithmetic operations as appropriate. Note that the position of the element of the object matrix after processing is associated to the position where the partial matrix is cut out. For example, the value calculated by using the most upper-left partial matrix becomes the element, in the first row and first column, of the object matrix after processing. Further, a value calculated by using the most lower-right partial matrix becomes the element, which is the most lower-right, of the object matrix after processing.

In the example illustrated in this figure, the pre-processing unit 140 performs processing of expanding at least one of the rows and the columns of the object matrix by adding a dummy value to the outer periphery of the object matrix before (1). In the example illustrated in this figure, a row having a dummy value is added above the first row, a row having a dummy value is added further below the lowermost row of the object row, and a column having a dummy value is added further to a left side of the leftmost column. The dummy values added here are all the same values (e.g., 0). However, this processing may not be performed.

Further, in the example illustrated in this figure, the pre-processing unit 140 also adds a dummy value to the outer periphery of a matrix of 1×n, which is a target value, and expands at least one of rows and columns of the matrix. Then, the pre-processing unit 140 performs processing of applying a digital filter to the expanded matrix in the same manner as the input data. Then, by repeating this processing, target data after processing are generated. The digital filter for when working the target data is preferably the same as the digital filter for when working the input data, but may be different. In the example illustrated in this figure, the target data after processing are one row and one column, but the present invention is not limited thereto.

When the above-described conversion processing is repeated, it is not necessary to use the same digital filter in each conversion processing. Since each of these digital filters is optimized, these digital filters are mostly different from each other.

Figure 7:
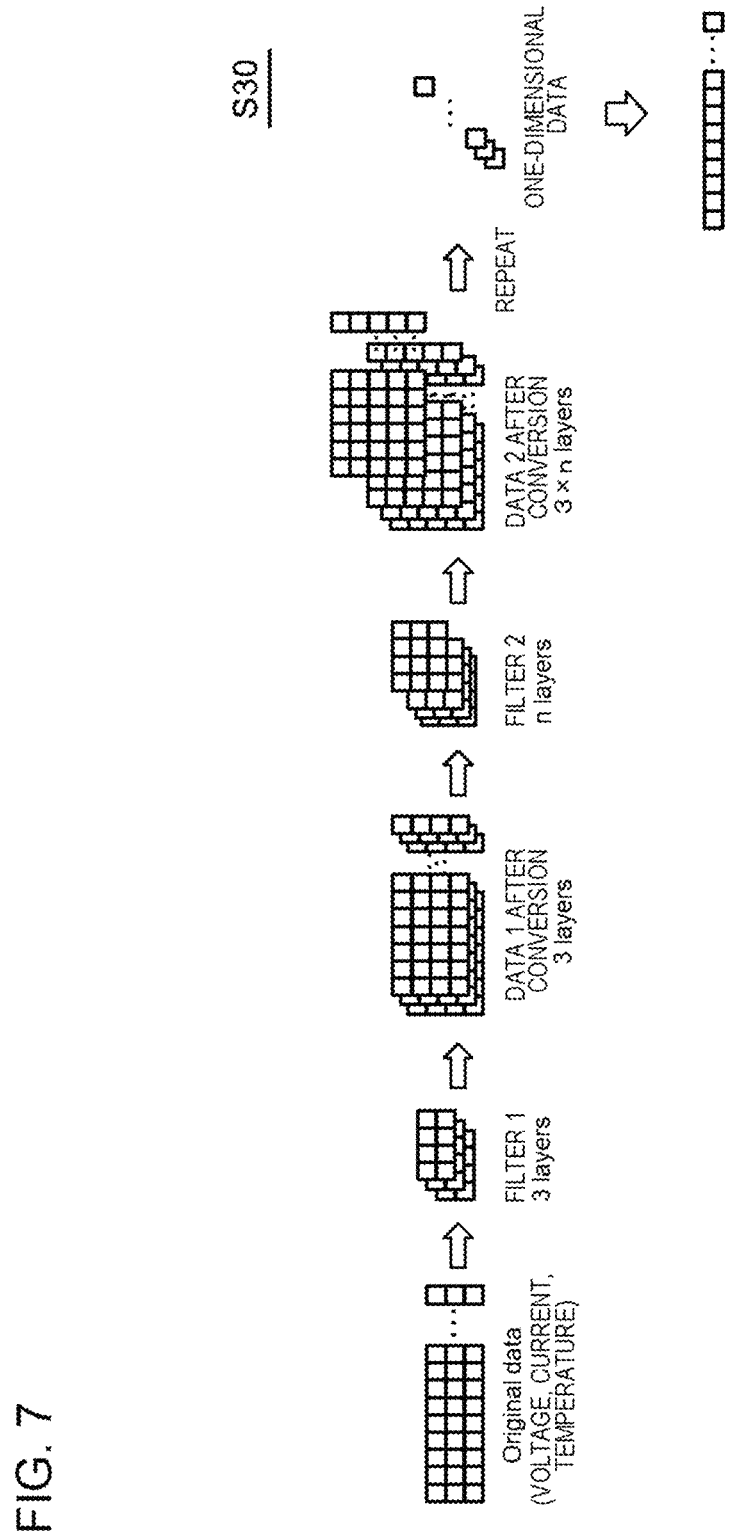
FIG. 7 is a diagram for explaining a second example of step S30 of FIG. 6.
Figure 8:
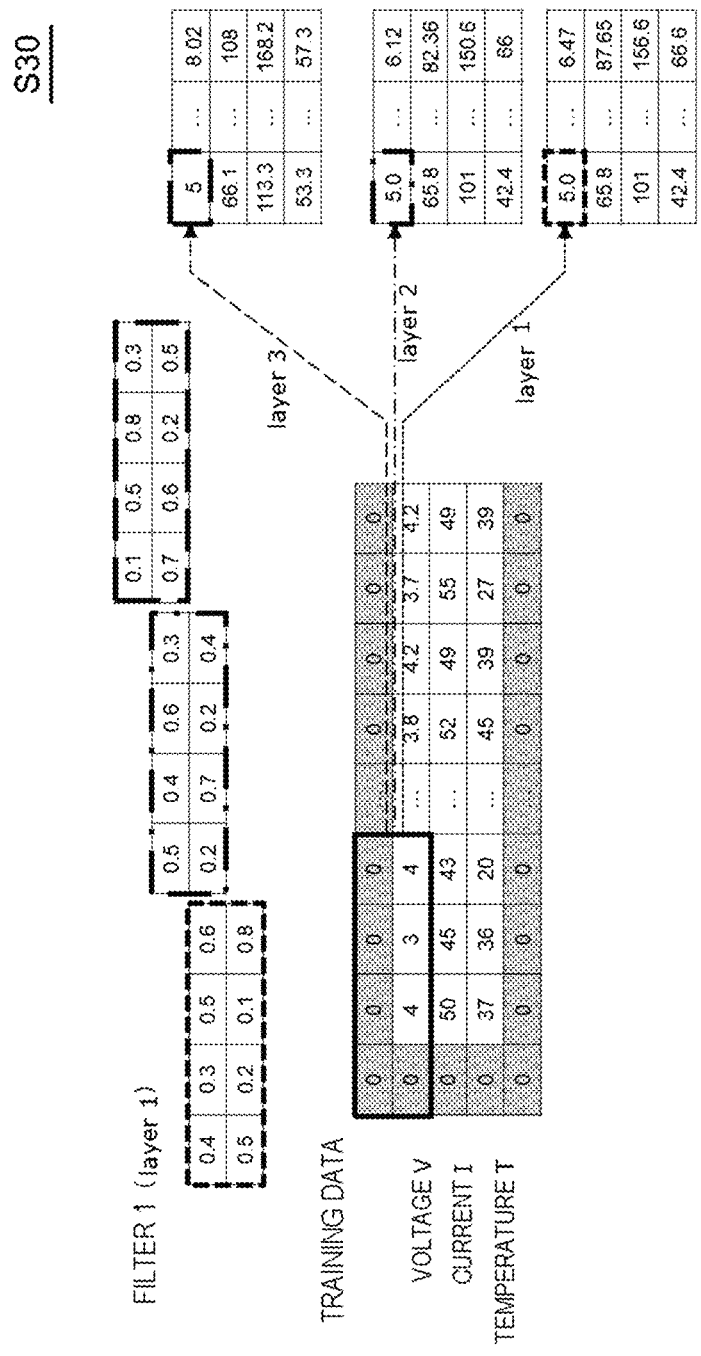
FIG. 8 is a diagram for explaining the second example of step S30 of FIG. 6.

FIGS. 7 and 8 are diagrams for explaining a second example of the pre-processing (step S30 in FIG. 6) performed by the pre-processing unit 140 of the model generation apparatus 10. In this example, as illustrated in FIG. 8, the pre-processing unit 140 prepares a plurality of digital filters for a single conversion processing, and generates an object matrix after conversion for each of the plurality of digital filters. For example, when three digital filters are used in certain conversion processing, the number of object matrices after conversion is three times the number of object matrices before conversion.

Then, as illustrated in FIG. 7, when the pre-processing unit 140 repeats this processing, at any stage, the plurality of object matrices after conversion are all in one row and one column. Then, the pre-processing unit 140 generates one-dimensional data to be input data by arranging the data of one row and one column.

Figure 9:
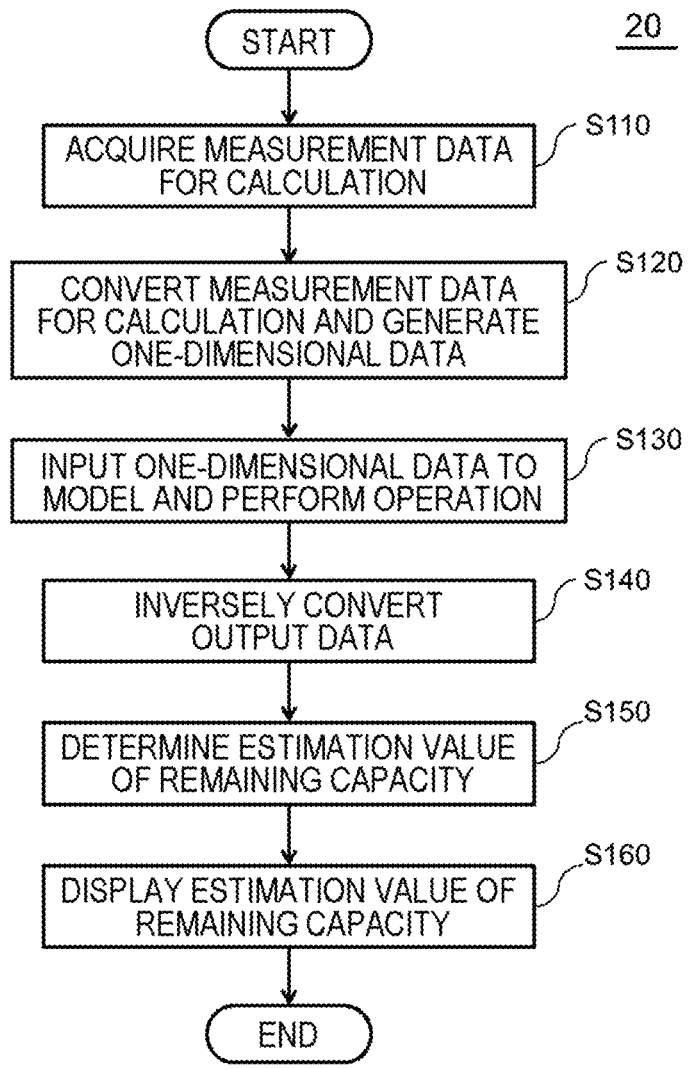
FIG. 9 is a flowchart illustrating one example of processing performed by the remaining capacity estimation apparatus.
Figure 10:
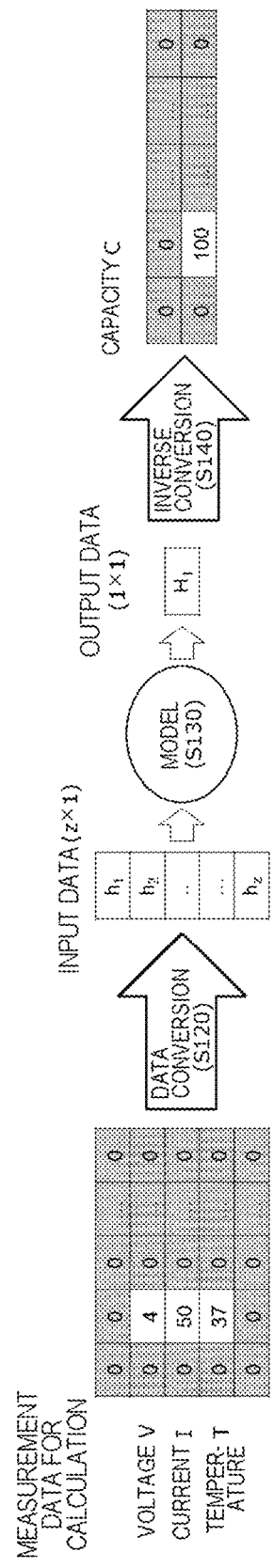
FIG. 10 is a diagram for explaining a main part of the processing illustrated in FIG. 9.

FIG. 9 is a flowchart illustrating one example of calculation processing of the remaining capacity of the storage battery 30, which is performed by the remaining capacity estimation apparatus 20. FIG. 10 is a diagram for explaining a main part of the processing illustrated in FIG. 9. The storage battery 30 generates measurement data for calculation every second, for example. The remaining capacity estimation apparatus 20 performs the processing illustrated in this figure each time the storage battery 30 generates the measurement data for calculation.

First, the calculation data acquisition unit 230 of the remaining capacity estimation apparatus 20 acquires the measurement data for calculation from the storage battery 30 (step S110 in FIG. 9). Then, the calculation unit 240 generates converted data by performing the same conversion processing as the pre-processing performed by the pre-processing unit 140 of the model generation apparatus 10 on the measurement data for calculation (step S120 in FIG. 9).

As one example, as illustrated in FIG. 10, the measurement data for calculation are a matrix of 1×m (1×3 in the example of FIG. 10), but the calculation unit 240 adds dummy data (e.g., 0), thereby expanding the measurement data for calculation so to be a matrix of m×n, the same as the training target data. Then, the calculation unit 240 performs the same processing as the pre-processing of the training target data on the measurement data for calculation after expansion, thereby generating one-dimensional data consisting of z pieces of data. At this time, the calculation unit 240 reads the value of the digital filter from the model storage unit 220 and uses the value (step S120).

Next, the calculation unit 240 inputs the one-dimensional data to the model stored in the model storage unit 220 and acquires output data. As illustrated in FIG. 10, the output data have the same data structure (1×1 matrix in the example illustrated in this figure) as the target value of the training data after conversion used when the model is generated (step S130).

Next, the calculation unit 240 performs inverse conversion on the output data (step S140). This inverse conversion performs a process opposite to the pre-processing performed on the target value of the training data. The processing performed at the time of the inverse conversion is set by using the value of the digital filter used in step S120. Thus, the output data have the same data structure as the target value of the training data before conversion. Then, the calculation unit 240 sets an element at a predetermined position in the output data as a calculation value of the remaining capacity (step S150). The "predetermined position" is set according to the position of the measurement data for calculation before expansion in the measurement data for calculation after expansion.

Specifically, a setting rule of "predetermined position" is the same as a correspondence relationship between a position of input data of actual result measurement data in the training target data (object matrix) of m×n before conversion and a position of the target value of the actual result measurement data in data of 1×n of the target value before conversion. In the example illustrated in FIG. 10, the measurement data for calculation are located in the second column from the left of the matrix before conversion and after adding the dummy value (e.g., 0) (after expansion). The measurement data for training of the second column from the left in the object matrix (training data) after expansion are associated to a second element from the left in the column of the target value before conversion and after adding the dummy value (after expansion). Therefore, the calculation unit 240 sets a value indicated by the second element from the left in the output data as the remaining capacity of the storage battery 30.

Thereafter, the display processing unit 250 displays the calculated remaining capacity on the display 260 (step S160).

As described above, according to the present example embodiment, the remaining capacity estimation apparatus 20 calculates the remaining capacity of the storage battery 30, by using the model generated by the model generation apparatus 10. The model generation apparatus 10 can generate a model when there are a current, a voltage, and a temperature of the storage battery 30 as input values of the training data. Therefore, the number of parameters of the storage battery 30 required when the remaining capacity estimation apparatus 20 calculates the remaining capacity of the storage battery 30 can be set to three (current, voltage, and temperature) at minimum. Therefore, in a case of estimating the remaining capacity of the storage battery 30 by using machine learning, the calculation amount required for the remaining capacity estimation apparatus 20 is reduced.

Although the example embodiments of the present invention have been described above with reference to the drawings, these are examples of the present invention, and various configurations other than the above can also be adopted.

Further, in the plurality of flowcharts used in the above-described explanation, a plurality of steps (processes) are described in order, but an execution order of the steps executed in each example embodiment is not limited to the order described. In each of the example embodiments, the order of the steps illustrated can be changed within a range that does not interfere with the contents. Further, the above-described example embodiments can be combined within a range in which the contents do not conflict with each other.

This application claims priority based on Japanese Patent Application No. 2020-073844 filed on Apr. 17, 2020, the disclosure of which is incorporated herein in its entirety.

REFERENCE SIGNS LIST

10 Model generation apparatus
20 Remaining capacity estimation apparatus
30 Storage battery
40 Equipment
50 Data collection apparatus
110 Actual result acquisition unit
120 Actual result storage unit
130 Training data acquisition unit
140 Pre-processing unit
150 Model generation unit
160 Model storage unit
170 Model transmission unit
180 Verification data acquisition unit
210 Storage processing unit
220 Model storage unit
230 Calculation data acquisition unit
240 Calculation unit
250 Display processing unit
260 Display
270 Data storage unit
280 Data transmission unit

The invention claimed is:

1. A model generation apparatus comprising:
at least one memory storing instructions; and
at least one processor configured to execute the instructions to perform operations comprising:
acquiring a plurality of pieces of training data using, as input values, measurement data for training including a current, a voltage, and a temperature of a storage battery and using, as a target value, a remaining capacity value for training being a remaining capacity value of the storage battery; and
generating a model for calculating a remaining capacity of an object storage battery from measurement data for calculation including a current, a voltage, and a temperature of the object storage battery, the object storage battery being an object of processing, by performing machine learning on the plurality of pieces of training data, wherein the operations further comprise:
processing n sets of the training data into an object matrix of 3×n;
performing processing on the object matrix, thereby generating one-dimensional data consisting of L pieces of data;
generating the model using the one-dimensional data as an input value; and
generating the one-dimensional data by performing, at least once, conversion processing of, while expanding one of rows or columns of the object matrix to the number of dimensions larger than the number of dimensions of the one, the one being associated to the current, the voltage, and the temperature, reducing the other of the rows or the columns of the object matrix to the number of dimensions smaller than the number of dimensions of the other by processing a digital filter on the object matrix.

2. A model generation apparatus comprising:
at least one memory storing instructions; and
at least one processor configured to execute the instructions to perform operations comprising:
acquiring a plurality of pieces of training data using, as input values, measurement data for training including a current, a voltage, and a temperature of a storage battery and using, as a target value, a remaining capacity value for training being a remaining capacity value of the storage battery;
processing n sets of the training data into an object matrix of m×n (where m is the number of types of data included in measurement data for training) and performing processing on the object matrix, thereby generating one-dimensional data consisting of z pieces of data; and
generating a model for calculating a remaining capacity of an object storage battery from measurement data for calculation including a current, a voltage, and a temperature of the object storage battery, the object storage battery being an object of processing, by performing machine learning using the one-dimensional data as an input value, wherein the operations comprise:
generating the one-dimensional data by performing, at least once, conversion processing of, while expanding one of rows or columns of the object matrix to the number of dimensions larger than the number of dimensions of the one, the one being associated to the current, the voltage, and the temperature, reducing the other of the rows or the columns of the object matrix to the number of dimensions smaller than the number of dimensions of the other by processing a digital filter on the object matrix.

3. The model generation apparatus according to claim 1, wherein
the digital filter is a matrix, and
the operations comprise performing following (1) and (2) at least once as the conversion processing:
(1) cutting out a partial matrix consisting of the same number of rows and the same number of columns as the digital filter, from the object matrix; and
(2) setting a value acquired by operating the digital filter on the partial matrix and adding each element of a result of the operation, as an element of the object matrix after processing.

4. The model generation apparatus according to claim 3, wherein
the operations comprise performing processing of expanding at least one of rows or columns of the object matrix by adding a dummy value to an outer periphery of the object matrix before the (1) in the conversion processing.

5. The model generation apparatus according to claim 1, wherein
the operations comprise processing n number of the remaining capacity values for training being associated to the n sets of training data, thereby generating the target value consisting of k pieces of data (where k<n).

6. The model generation apparatus according to claim 1, wherein
the machine learning is performed by using a neural network.

7. The model generation apparatus according to claim 1, wherein
actual result data including measurement values of a current, a voltage, a temperature, and a remaining capacity value of a storage battery are prepared,
the training data are generated by using a part of the actual result data, and
the operations comprise verifying the model by using at least one piece of the remaining actual result data.

8. The model generation apparatus according to claim 1, wherein the operations comprise:
acquiring the training data for each type of the storage battery; and
generating the model for each type of the storage battery.

9. A non-transitory computer-readable medium storing a program causing a computer to perform operations comprising:
acquiring a plurality of pieces of training data using, as input values, measurement data for training including a current, a voltage, and a temperature of a storage battery and using, as a target value, a remaining capacity value for training being a remaining capacity value of the storage battery; and
generating a model for calculating a remaining capacity of an object storage battery from measurement data for calculation including a current, a voltage, and a temperature of the object storage battery by performing machine learning on the training data, the object storage battery being an object of processing, wherein the operations further comprise:
processing n sets of the training data into an object matrix of 3×n;
performing processing on the object matrix, thereby generating one-dimensional data consisting of L pieces of data;
generating the model using the one-dimensional data as an input value; and
generating the one-dimensional data by performing, at least once, conversion processing of, while expanding one of rows or columns of the object matrix to the number of dimensions larger than the number of dimensions of the one, the one being associated to the current, the voltage, and the temperature, reducing the other of the rows or the columns of the object matrix to the number of dimensions smaller than the number of dimensions of the other by processing a digital filter on the object matrix.

10. A non-transitory computer-readable medium storing a program causing a computer to perform operations comprising:
acquiring a plurality of pieces of training data using, as input values, measurement data for training including a current, a voltage, and a temperature of a storage battery and using, as a target value, a remaining capacity value for training being a remaining capacity value of the storage battery;
processing n sets of the training data into an object matrix of m×n and performing processing on the object matrix, thereby generating one-dimensional data consisting of z pieces of data; and
generating a model for calculating a remaining capacity of an object storage battery from measurement data for calculation including a current, a voltage, and a temperature of the object storage battery, the object storage battery being an object of processing, by performing machine learning using the one-dimensional data as an input value, wherein the operations comprise:
generating the one-dimensional data by performing, at least once, conversion processing of, while expanding one of rows or columns of the object matrix to the number of dimensions larger than the number of dimensions of the one, the one being associated to the current, the voltage, and the temperature, reducing the other of the rows or the columns of the object matrix to the number of dimensions smaller than the number of dimensions of the other by processing a digital filter on the object matrix.

11. The model generation apparatus according to claim 2, wherein
the digital filter is a matrix, and
the operations comprise performing following (1) and (2) at least once as the conversion processing:
(1) cutting out a partial matrix consisting of the same number of rows and the same number of columns as the digital filter, from the object matrix; and
(2) setting a value acquired by operating the digital filter on the partial matrix and adding each element of a result of the operation, as an element of the object matrix after processing.

12. The model generation apparatus according to claim 11, wherein
the operations comprise performing processing of expanding at least one of rows or columns of the object matrix by adding a dummy value to an outer periphery of the object matrix before the (1) in the conversion processing.

13. The model generation apparatus according to claim 2, wherein
the operations comprise processing n number of the remaining capacity values for training being associated to the n sets of training data, thereby generating the target value consisting of k pieces of data (where k<n).

14. The model generation apparatus according to claim 2, wherein
the machine learning is performed by using a neural network.

15. The model generation apparatus according to claim 2, wherein
actual result data including measurement values of a current, a voltage, a temperature, and a remaining capacity value of a storage battery are prepared,
the training data are generated by using a part of the actual result data, and
the operations comprise verifying the model by using at least one piece of the remaining actual result data.

16. The model generation apparatus according to claim 2, wherein the operations comprise:
acquiring the training data for each type of the storage battery; and
generating the model for each type of the storage battery.

* * * * *